United States Patent
Dunlop

[15] 3,659,960
[45] May 2, 1972

[54] TRANSMISSION OF FLUIDS THROUGH A PIPELINE

[72] Inventor: Donald D. Dunlop, Fairfax, Va.

[73] Assignee: Creative Enterprises International, Norman, Okla.

[22] Filed: Nov. 13, 1969

[21] Appl. No.: 876,353

[52] U.S. Cl. .................................417/53, 417/52, 417/209
[51] Int. Cl. ..........................................F04b 19/24, F04f 1/18
[58] Field of Search....................417/208, 209, 53, 52, 207; 137/13; 60/25, 26, 203

[56] References Cited

UNITED STATES PATENTS

| | | |
|---|---|---|
| 3,087,438 | 4/1963 | Ciesielski..............................417/207 |
| 776,106 | 11/1904 | Beurrier............................417/379 X |
| 2,429,940 | 10/1947 | McDaniel..............................417/209 |
| 3,427,808 | 2/1969 | Butcher..............................60/203 X |
| 3,436,908 | 4/1969 | Van Delic..................................60/26 |

Primary Examiner—Carlton R. Croyle
Assistant Examiner—R. E. Gluck
Attorney—Richards, Harris & Hubbard

[57] ABSTRACT

A volatile fluid is transmitted through a pipeline containing a series of check valves by differential heating along contiguous sections of the pipeline to create a decreasing temperature gradient and a consequent decreasing pressure gradient in the direction of desired transmission to thereby cause fluid flow in a desired direction, the check valves preventing the reversal of fluid transmission upon reversal or discontinuance of the temperature gradient. In long pipelines, the differential heating is supplied by the sun moving along the pipeline. Multicomponent fluids can be transmitted by a selection of a volatile mixture of fluid components in such proportions as to create desired pressure differentials and rates of transmission.

3 Claims, 2 Drawing Figures

INVENTOR
DONALD D. DUNLOP

Richards, Harris & Hubbard
ATTORNEY

TRANSMISSION OF FLUIDS THROUGH A PIPELINE

BACKGROUND OF THE INVENTION

This invention relates to the transmission of fluids through a pipeline. In another aspect this invention relates to a novel method utilizing heat energy to transmit fluids, including mixtures of relatively volatile and relatively non-volatile fluid components, through a pipeline.

SUMMARY OF THE INVENTION

The invention contemplates a method for moving a volatile fluid through a pipeline which includes the steps of introducing a fluid into the pipeline, causing the pipeline to be differentially heated to create a decreasing temperature gradient and a consequent decreasing pressure gradient in the volatile fluid along the pipeline thereby causing movement of the fluid through the line, and preventing the tendency of fluid to move in the opposite direction on reversal or equalization of the temperature gradient.

The method of this invention may be applied to transmitting relatively non-volatile fluids (fluids exhibiting relatively low vapor pressure), by mixing therewith relatively volatile fluids (fluids exhibiting relatively high vapor pressures), so that a significant pressure head is created by a decreasing temperature gradient along the pipeline. Such mixtures can be controlled as to proportions in order to control pressure head and rate of flow as desired.

The method of this invention is particularly well suited to transmission through pipelines in directions having significant directional components in the direction of the sun's movement with respect to earth. The movement of the sun provides the differential heating necessary to create the desired temperature and pressure gradients along the pipeline. The method can thus be applied to transmission of fluids in generally westerly or easterly directions away from a point such as a production site at which the fluids are continuously produced.

Fluids from production can be introduced into the pipeline during the nighttime hours when the pipe is relatively cool and pressure is low, and can be transmitted westwardly with efficiency during the daytime hours as the sun rises, heating the pipeline through successively increasing temperatures along the westwardly extending line. The prevention of transmission in the reverse direction is necessary to avoid backflow from the higher temperatures which are created remote from the inlet point later in the day. A similar method can be employed to effect transmission in an easterly direction by solar energy in accordance with this invention.

Further encompassed within the scope of this invention is a system for transmitting volatile fluids, including mixtures containing relatively volatile and relatively non-volatile fluid components, i.e., fluids having relatively high and low vapor pressures, respectively, which system includes a pipeline lying generally in the direction of the sun's movement with respect to earth, the pipeline being provided with a series of check valves to oppose movement of liquid in one direction.

BRIEF DESCRIPTION OF THE DRAWING

For a further understanding of the invention, reference may now be had to the following description in conjunction with the accompanying drawings in which.

DESCRIPTION OF THE PREFERRED EMBODIMENTS

Figure 1:
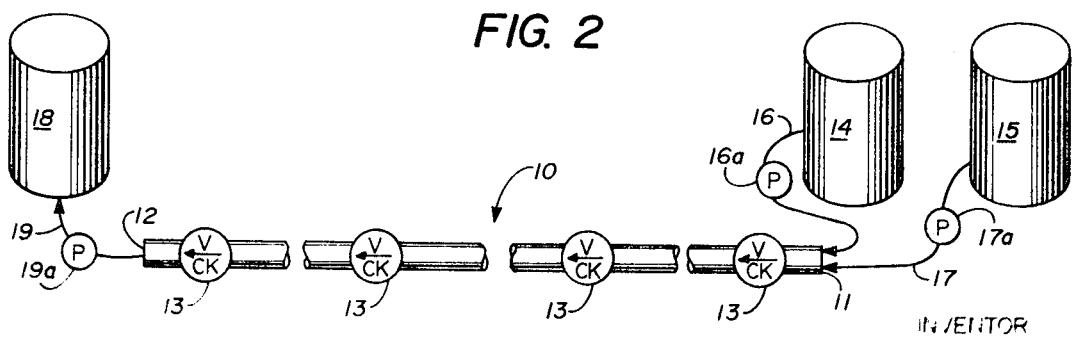
FIG. 1 is a schematic diagram of a system adapted to employment of the present invention.

Now referring to FIG. 1, a schematic illustration of a system of this invention is shown which comprises a pipeline 10 which extends from inlet point 11 in a generally westwardly direction to terminal or outlet point 12. Pipeline 10 has a series of check valves 13 operatively positioned at points throughout the length thereof which will allow fluid to flow therethrough only in a westwardly direction.

Fluid storage tanks 14 and 15 are connected to the inlet of pipeline 10 via suitable intermediate conduit means 16 and 17 having pumping means 16a and 17a, respectively, operatively positioned therein. It is noted that intermediate conduit means 16 and 17 can have suitable valve and flow control means operatively associated therewith which control the ratio of fluids from storage tanks 14 and 15, respectively, which are delivered to inlet point 11 of pipeline 10. Outlet 12 of pipeline 10 is operatively connected to a suitable receiving tank 18 by a suitable conduit means such as conduit 19 and pump19a.

Pipeline 10 can be several hundred miles in length and is preferably positioned upon the earth's surface or slightly under the earth's surface in a manner such that it can readily absorb heat energy emitted from the sun. Check valve 13 are sequentially positioned at any convenient distance within pipeline 10. It is normally preferable to have a check valve 13 positioned about every mile within pipeline 10.

This invention can be utilized to transport any fluid or fluid mixture which exhibits a substantial increase in vapor pressure when heat between the temperatures of about 50° to 150° F, and preferably from about 70° to about 100° F. The invention is applicable to the transmission of highly volatile normally liquid fluids, normally vaporous fluids, and mixtures thereof. It is generally preferable that the fluids exhibit a two to ten-fold increase in vapor pressure throughout the temperature range to which they are subjected; however, lower increases of vapor pressure throughout the operable temperature range can be utilized.

The invention is preferably applied to the transmission of a mixture of at lest two fluids having markedly different vapor pressures. The utilization of such a mixture permits convenient control of the pressure differentials and rates of flow by selection of the proportions in the mixture. The ratio between relatively volatile and relatively non-volatile components within the transported fluid can be controlled in any particular pipeline as a function of the seasonal daily temperature differential, the position of the pipeline relative to the earth's surface, the elevation of the pipeline, and the like.

It will be recognized that a large number of fluids can be transmitted in such a system as contemplated by the present invention. Simply by way of pointing out one example of a system employing a plurality of fluid components, FIG. 2 shows the vapor pressure-temperature relationships for two fluids, ethylene and ethylene oxide, and for various mixtures thereof.

Figure 2:
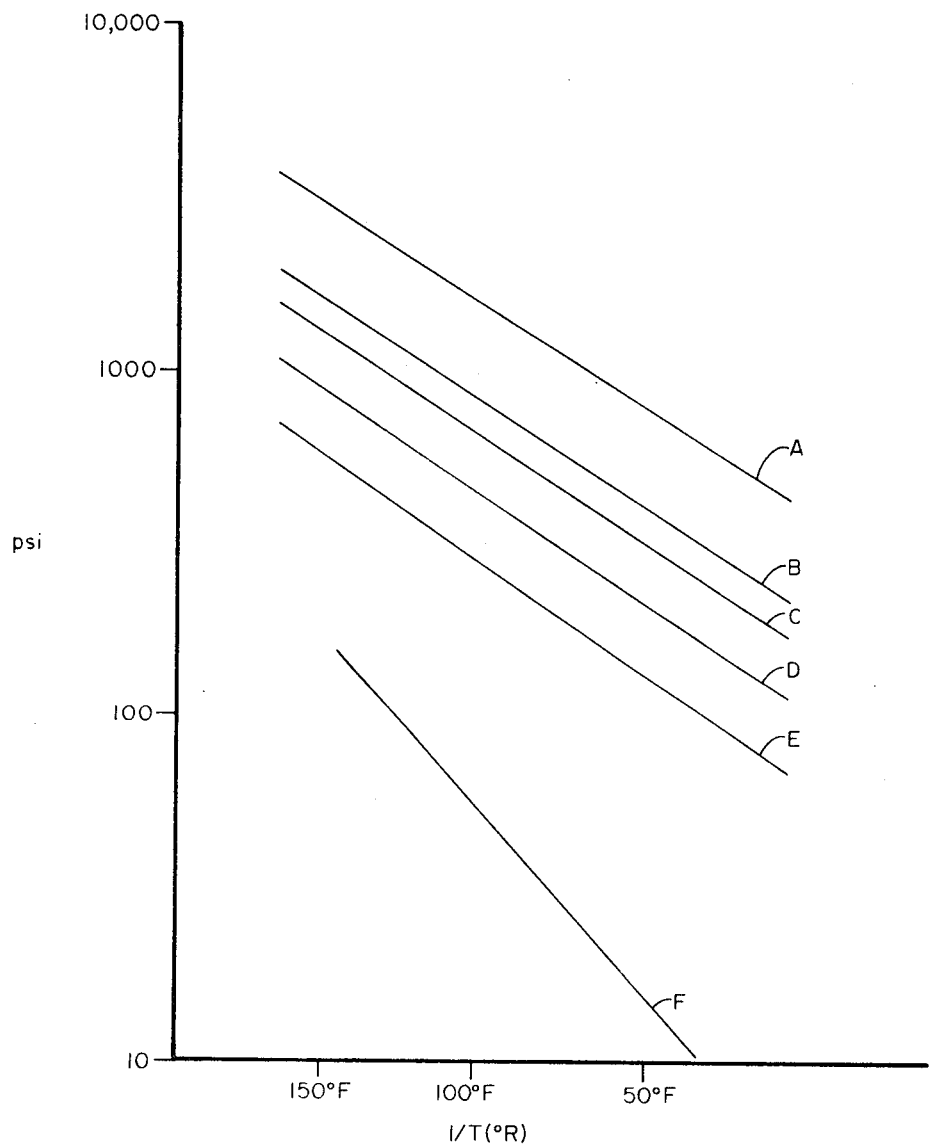
FIG. 2 is a temperature-vapor pressure plot for two liquids and various mixtures thereof, which can be transmitted in accordance with this invention.

The graph shown in FIG. 2 is a plot of vapor pressure versus the inverse of temperature for ethylene, ethylene oxide, and a number of mixtures thereof, between the temperatures 50° F and 150° F. The data for the mixtures were obtained by the application of Raoult's Law.

The abscissa of the graph is the inverse of temperature in degrees Rankine, with the points corresponding to 50° F, 100° F, and 150° F being shown along the abscissa. The ordinate of the graph is vapor pressure in psi on a logarithmic scale. At the left end of each line, the vapor pressure variation between 50° F and 150° F for the mixture represented by that line is indicated. The table below gives the identification of the lines shown in FIG. 2.

| Line | Mole percent Ethylene | Mole percent Ethylene Oxide |
|---|---|---|
| A | 100 % | 0 % |
| B | 50 % | 50 % |
| C | 40 % | 60 % |
| D | 25 % | 75 % |
| E | 15 % | 85 % |
| F | 0 % | 100 % |

The data set forth in FIG. 2 gives an indication of the control which can be achieved in a multi-component fluid system where at least one fluid has a relatively high vapor pressure, such as ethylene, and at least another fluid has a much lower vapor pressure, such as ethylene oxide. For a given temperature gradient, a pressure gradient can be selected over a wide range by control of the composition of the fluid introduced into the pipeline. For example, As FIG. 2 indicates, for a temperature variation of 50°–150° F, a pressure differential is available all the way from 160 psi to 2,300 psi with variation in the proportions of the two fluids.

It will be appreciated that such multi-component fluid systems as may be employed in this invention provide an excellent mode of transporting fluids that would not otherwise be amenable to transmission by the technique of this invention. Whereas a relatively low volatility fluid could not generate significant pressure head in a pipeline from radiant heating, the mixing of such a fluid with a compatible highly volatile fluid will permit such transmission efficiently.

Fluids chosen for such a mixture should be compatible, and if it is important to utilize them separately at the destination point, they should be conveniently separable by fractionation or other techniques. It is noted that the multi-component fluid system need not be an ideal solution, it is only necessary that the components within the system are non-deleterious to one another.

In the preferred method of operation of the system as illustrated in FIG. 1, storage tanks 14 and 15 can be operatively connected by means not shown to a suitable production plant for the fluid components to be transported. These storage tanks can be filled during the daytime hours (the period of time when the sun is out) when the temperature and pressure of the pipeline are high adjacent inlet point 11. Next, fluids from tanks 14 and 15 are injected into pipeline 10 during the hours of darkness at inlet point 11 when the line is relatively cool and the pressure relatively low. As the sun rises at the beginning of the day, the temperature and pressure at the east end (point 11) of the pipeline 10 will begin to increase thereby causing a flow of fluid in a westerly direction as desired. The flow will continue as the sun advances along the length of pipeline 10 until the sun is advanced so far along the length of the pipeline that the temperature and pressure gradients are eliminated. As the gradients reverse, the check valves 13 will prevent backflow in the system.

A specific mode of operation using a fluid consisting of 25 mole % ethylene and 75 mole % ethylene oxide in an east-to-west oriented pipeline system having a temperature which fluctuates from a low nighttime internal pipeline temperature of 50° F to a maximum internal daytime pipeline temperature of 150° F wherein the pipeline point 11 is at a cooling period of from 1,800 hours one day to 0600 hours the following day and a corresponding heating period from 0600 hours one day until 1800 hours the following day is as follows: Ethylene is contained within storage tank 14 and ethylene oxide is contained within storage tank 15, and pump means 16a and 17a are actuated at 1800 hours on any given day to inject the ratio of 25 mole % ethylene and 75 mole % ethylene oxide into pipeline 10 from storage tanks 14 and 15, respectively. This injection procedure continues until about 0600 hours the following day, at which time pumps 16a and 17a are stopped. As the sun rises and begins the heating of the pipeline 10 adjacent point 11, the vapor pressure of the ethylene-ethylene oxide fluid within the pipeline slowly increases. This heating of the pipeline by the sun will continue to increase the fluid within the pipeline from a low temperature of 50° F to a maximum temperature of 150° F. This temperature increase causes a corresponding vapor pressure increase of 700 psig. The increase in temperature by sequential solar heating along the length of the pipeline will result in a decreasing temperature gradient in the westerly direction and thereby result in the displacement of fluid through check valves 13 as the fluid in the hotter portion of the pipeline expands. This expansion-displacement operation occurs along the length of the pipeline 10 as it is traversed by the movement of the sun and results in the transportation of the fluid contained therewithin during the daylight hours (0600 hours to 1800 hours).

Thus, the technique and system of this invention is particularly well suited for transmission generated by radiant energy from the sun. Such transmission, employing an energy source being one which is not costly, indeed free, and which in many climates is extremely reliable, possesses many advantages.

Such utilization requires that the sun not heat all portions of the pipeline to the same temperatures at the same times. The most efficient utilization of the solar energy will be achieved when the pipeline is substantially aligned with the movement of the sun, but it is not necessary that there be such exact alignment. It is only necessary that the pipeline must be running in some direction other than simply perpendicular to the movement of the sun with respect to the earth.

A system wherein it is desired to move liquids generally from west to east would be similar to that just described, but would have its period of transmission at different times. The pressure and temperature gradient favorable to easterly flow would be established in the later hours of the day after the westerly terminal point of the pipeline had begun to cool.

Having described the invention in connection with the foregoing embodiments thereof, it is to be understood that further modifications may now suggest themselves to those skilled in the art and it is intended to cover such modifications as fall within the scope of the appended claims.

I claim:

1. A method for transmitting a relatively non-volatile fluid through an enclosed pipeline in a desired direction which comprises:
   a. mixing the fluid with a relatively volatile fluid to produce a liquid mixture having a relatively high vapor pressure;
   b. introducing the mixture into the pipeline;
   c. sequentially heating said pipeline to create a decreasing temperature gradient in the mixture along the pipeline in the desired direction; and
   d. preventing the tendency of the mixture to return in the opposite direction on reversal of the temperature gradient as said pipeline is sequentially colled after said sequential heating.

2. The method of claim 1 wherein the heating results from solar radiation.

3. The method of claim 1 wherein said relatively volatile fluid is ethylene and said relatively non-volatile fluid is ethylene oxide.

* * * * *